(12) United States Patent
Collins et al.

(10) Patent No.: US 7,528,720 B2
(45) Date of Patent: May 5, 2009

(54) RADIO FREQUENCY IDENTIFICATION TAG-BASED TASK EFFECTUATION METHOD AND APPARATUS

(75) Inventors: Timothy J. Collins, Homer Glen, IL (US); Katherine M. Devanie, Glendale Heights, IL (US); Richard S. Rachwalski, Lemont, IL (US)

(73) Assignee: Motorola, Inc., Schaumburg, IL (US)

( * ) Notice: Subject to any disclaimer, the term of this patent is extended or adjusted under 35 U.S.C. 154(b) by 355 days.

(21) Appl. No.: 11/380,724

(22) Filed: Apr. 28, 2006

(65) Prior Publication Data

US 2007/0252709 A1 Nov. 1, 2007

(51) Int. Cl.
*G08B 13/14* (2006.01)
(52) U.S. Cl. .................................. 340/572.1
(58) Field of Classification Search ............ 340/286.09, 340/572.1–572.9, 573.1, 10.1; 235/375, 235/376
See application file for complete search history.

(56) References Cited

U.S. PATENT DOCUMENTS

| | | | |
|---|---|---|---|
| 5,724,482 A | 3/1998 | Grewe et al. | |
| 6,710,891 B1 | 3/2004 | Vraa et al. | |
| 6,812,838 B1 | 11/2004 | Maloney | |
| 7,227,469 B2 | 6/2007 | Varner et al. | |
| 7,289,855 B2 | 10/2007 | Nghiem et al. | |
| 7,295,120 B2 | 11/2007 | Waldner et al. | |
| 7,309,000 B2 | 12/2007 | McDonald | |
| 7,350,715 B2 | 4/2008 | Pradhan et al. | |
| 2004/0100380 A1 | 5/2004 | Lindsay et al. | |
| 2004/0100383 A1* | 5/2004 | Chen et al. ............... | 340/572.1 |
| 2005/0125097 A1 | 6/2005 | Chudy et al. | |
| 2006/0214794 A1* | 9/2006 | Wang ...................... | 340/572.1 |
| 2006/0244597 A1 | 11/2006 | Tethrake et al. | |

OTHER PUBLICATIONS

Related International Patent Application No. PCT/US07/64938, Search Report dated Sep. 4, 2008, 2 pgs.
George A. Bugg, "PCT International Search Report and Written Opinionm" WIPO, ISA/US, Aug. 21, 2008. Search Report from related application.
Lam P. Pham, "PTO-892," Issued with Notice of Allowance in related USA application.

* cited by examiner

*Primary Examiner*—Phung Nguyen

(57) ABSTRACT

An identifier of choice is correlated (102) with a predetermined task that potentially comprises a plurality of discrete human-enabled events. At least some of these discrete human-enabled events are then associated (104) with a corresponding capacitively-coupled radio frequency identification tag and the identifier then used (105) to monitor effectuation of the predetermined task. By one approach this monitoring comprises, at least in part, monitoring human-based task effectuation events via the capacitively-coupled radio frequency identification tags.

20 Claims, 1 Drawing Sheet

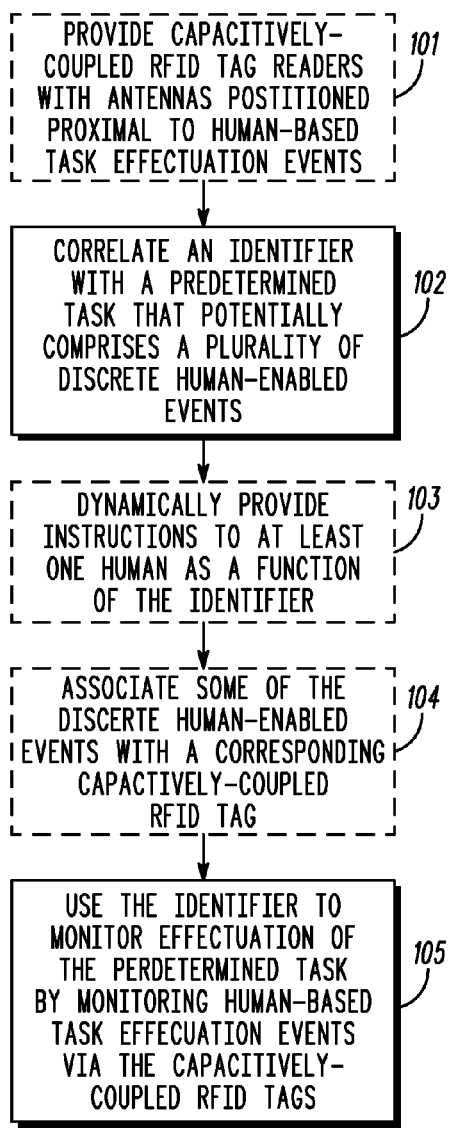
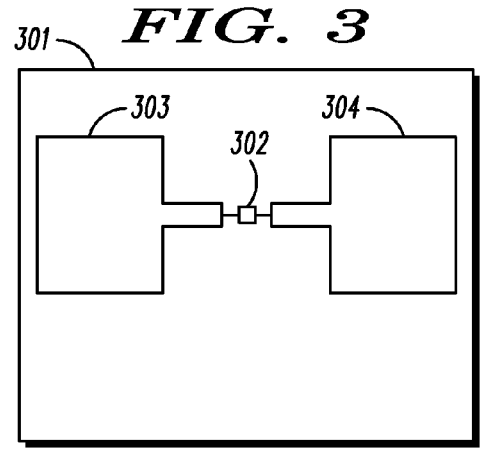
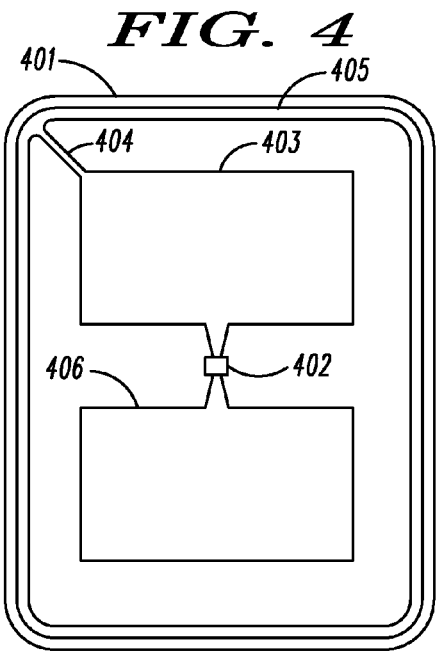
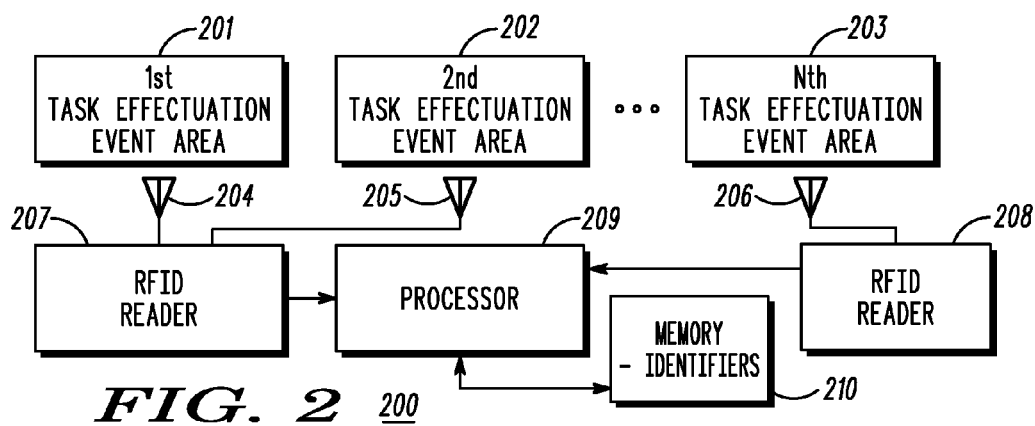

RADIO FREQUENCY IDENTIFICATION TAG-BASED TASK EFFECTUATION METHOD AND APPARATUS

RELATED APPLICATIONS

This application relates generally to a co-pending application Ser. No. 11/380,729 bearing the title RADIO FREQUENCY IDENTIFICATION TAG-BASED TRAY AND TRAY RECEIVING METHOD AND APPARATUS as was filed on even date herewith, the contents of which are incorporated herein by this reference.

TECHNICAL FIELD

This invention relates generally to the effectuation of tasks that comprise, at least in part, one or more discrete human-enabled events.

BACKGROUND

Tasks that are effectuated, in whole or in part, by human assistance or intervention are well known in the art. In some cases, such tasks are potentially comprised of any of a variety of discrete human-enabled events. As one illustrative example, a modern fast food restaurant offers a variety of food products where at least some of the food products require just-in-time or near-in-time final assembly prior to provision of those food products to a given consumer. In some cases the elements and order as characterize this assemblage may be relatively fixed and in other cases there may be a need to accommodate dynamic on-the-fly customization with respect, for example, to the constituent elements being used. For example, a fast food restaurant may wish to offer a basic offering such as a hamburger in conjunction with any combination of a variety of condiments as a customer might wish to specify.

Unfortunately, a modern service-based enterprise often faces significant challenges in ensuring both the efficiency and accuracy of their assemblage processes. The root causes for such difficulties are many and varied. Such assemblage may require the participation of a number of service personnel. This, in turn, can lead to mis-communications regarding what, exactly, is to be done to complete a given order. Efficiency requirements can also lead to problems in this regard when service personnel are allowed only a relatively brief period of time in which to complete their particular event contributions. Problems also often exist with respect to the knowledge base of such personnel and/or the frequency and/or regularity of training requirements that often attend the very high employee turnover rates that tend to typify many service-oriented enterprises.

Such issues, of course, have not gone completely unaddressed in the prior art. By one approach text-based instructions have been offered to display the defining elements for a given order. Such solutions, unfortunately, do not always adequately ensure the accurate and timely assemblage of a given product as per a given customer's stated preferences. Confusion and uncertainty can exist with respect to the precise meaning of such instructions. This problem can be particularly acute when service personnel are not fluent with respect to the language or languages being used to present the textual instructions.

BRIEF DESCRIPTION OF THE DRAWINGS

The above needs are at least partially met through provision of the radio frequency identification tag-based task effectuation method and apparatus described in the following detailed description, particularly when studied in conjunction with the drawings, wherein:

FIG. 1 comprises a flow diagram as configured in accordance with various embodiments of the invention;

FIG. 2 comprises a block diagram as configured in accordance with various embodiments of the invention;

FIG. 3 comprises a top plan schematic view as configured in accordance with various embodiments of the invention; and FIG. 4 comprises a top plan schematic view as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an identifier of choice is correlated with a predetermined task that potentially comprises a plurality of discrete human-enabled events. At least some of these discrete human-enabled events are then associated with a corresponding capacitively-coupled radio frequency identification tag and the identifier then used to monitor effectuation of the predetermined task. By one approach this monitoring comprises, at least in part, monitoring human-based task effectuation events via the capacitively-coupled radio frequency identification tags as correspond to the identifier-identified task.

By one approach, this can comprise configuring a task-effectuation venue with a plurality of capacitively-coupled radio frequency identification tag reader antennas such that an antenna is appropriately placed proximal to selected ones of the human-based task effectuation events. This, in turn, permits the detection of capacitively-coupled radio frequency identification tag proximity to such antennas and hence identification and tracking of the corresponding event. By one approach, for example, such capacitively-coupled radio frequency identification tags can comprise a part of a product container (such as, but not limited to a food product wrapper or box), a product ingredient dispenser (such as but not limited to a condiment dispenser), or a product bearing surface (such as, but not limited to a tray or the like).

So configured, a given service order can be uniquely identified and the specific product assemblage instructions and requirements as pertain to the order then associated with a list of required human-enabled events. The capacitively-coupled radio frequency identification tags as are associated with such human-enabled events can then serve to facilitate the monitoring of whether the correct human-enabled events as pertain to a given task in fact occur. Those skilled in the art will recognize that these teachings are readily leveraged for a variety of purposes. By one approach these teachings can greatly facilitate (or in some instances largely supplant) training. By another approach these teachings can aid with respect to avoiding assemblage errors that would lead to customer dissatisfaction should they otherwise be allowed to occur.

These and other benefits may become clearer upon making a thorough review and study of the following detailed description. Referring now to the drawings, and in particular to FIG. 1, these teachings provide for a process 100 that optionally provides 101 at least one capacitively-coupled radio frequency identification tag reader and a plurality of corresponding reader antennas positioned proximal to selected ones of a potential plurality of human-based task effectuation events as corresponds to a predetermined task. The task itself might comprise, for example, but it not limited to, a training activity, an assembly activity, and so forth.

To illustrate, and referring momentarily to FIG. 2, a given task effectuation area 200 can comprise a plurality of task effectuation event areas 201, 202, and 203. Each such area might correspond, for example, to a discrete and separate assembly event as pertains to the task of assembling a food product such as a sandwich. Though these event areas each pertain to discrete human-enabled events, such events may be carried out by a corresponding plurality of humans or by a single human as may depend upon the needs and/or opportunities as correspond to a given application setting. To illustrate, by one approach a separate person may be assigned to each of the depicted task effectuation event areas. By another illustrative approach a single person may be assigned to attend to each of the depicted task effectuation event areas.

By the above-described optional step 101, a capacitively-coupled radio frequency identification tag reader antenna 204, 205, and 206 can be proximally positioned to some (or, as illustrated, all) of these task effectuation event areas 201, 202, and 203. "Proximal," of course, is a somewhat relative term. In this context "proximal" refers to operational proximity such that a given antenna 205 can reliably detect a capacitively-coupled radio frequency identification tag in the second task effectuation event area 202 but not a capacitively-coupled radio frequency identification tag as may be present in the first task effectuation event area 201 or other task effectuation event areas 203.

As already suggested above, and with continued reference to FIG. 2, these antennas are coupled to one or more capacitively-coupled radio frequency identification tag readers, with two such readers 207 and 208 being shown in FIG. 2 to illustrate that while it is possible to connect only a single antenna 206 to a single corresponding reader 208 it is also possible to connect multiple antennas 204 and 205 to a single shared reader 207. Such capacitively-coupled radio frequency identification tag readers, antennas, and configuration options are well known in the art. Furthermore, these teachings are not overly sensitive to the selection and use of any particular choices in this regard aside from noting that variations in antenna design and layout will perhaps accompany deployment in varying application settings. Such knowledge, matter, and choices are well within the knowledge of one skilled in the art and hence further elaboration will not be provided here.

Referring again to FIG. 1, this process 100 then provides for correlating 102 an identifier with the predetermined task mentioned above. This identifier can assume any of a wide variety of forms including but not limited to numeric identifiers, alphabetic identifiers, alphanumeric identifiers, and voice identifiers to note but a few. In general it may be useful for this identifier to comprise a substantially unique identifier within at least some reasonable temporal context. This can mean employing a sequence of numbers where no repetitions are expected within, say, one hour, one day, one week, or the like.

If desired, this process 100 can optionally provide for dynamically providing 103 instructions to at least one human regarding at least one of the plurality of discrete human-enabled events as a function, for example, of the aforementioned identifier. To illustrate, the identifier can comprise an order number and that order number can identify a particular customer order regarding a particularly configured food product deliverable. These instructions, when provided, can comprise information regarding the correct assembly of that particular food product deliverable (i.e., the particular components to employ when constructing the food product deliverable, the order by which such components are added, and so forth).

Such instructions can be pre-stored and automatically selected and conveyed at the time of forming the order or, if desired, can be prepared at the time of forming the order. There are various known ways by which such instructions can be conveyed. Such ways include but are not limited to hard-copy printouts, display screens, audiblized instructions, signal lights to highlight components to be used (or those to be avoided), and so forth. As such mechanisms and choices are well known in the art and as these teachings are not particularly sensitive with respect to the selection of any given approach, further elaboration regarding such mechanisms and choices will not be provided here for the sake of brevity.

This process 100 then associates 104 at least some of the plurality of discrete human-enabled events with a corresponding capacitively-coupled radio frequency identification tag. Such tags are known in the art and include, but are not limited to, the Bistatix® line of capacitively-coupled (electrostatic) radio frequency identification tags as are offered by Motorola, Inc. Such tags typically comprise a small integrated circuit that contains the active circuitry of the tag and two capacitive plates that serve as antennas for the tag. As is known in the art such capacitive plates can be comprised of any of a wide variety of electrically conductive materials including, for example, conductive ink.

As one illustrative example, when the discrete human-enabled event comprises obtaining a product container, the product container may itself be combined with a capacitively-coupled radio frequency identification tag. For example, and referring momentarily to FIG. 3, when the product container comprises a paper-like sandwich wrapper 301, a capacitively-coupled radio frequency identification tag integrated circuit 302 may be affixed to the wrapper 301 and the corresponding two antenna plates 303 and 304 may be printed on the wrapper 301. One of these antenna plates can be sized and positioned to tend to ensure contact (either via a direct connection or a capacitive connection) with a human when the human touches or otherwise manipulates the wrapper 301.

As another illustrative example, when the discrete human-enabled event comprises provision or manipulation of a product bearing surface, the product bearing surface itself may be combined with a capacitively-coupled radio frequency identification tag. For example, and referring momentarily to FIG. 4, when the product bearing surface comprises a serving tray 401 as is known in the art, the capacitively-coupled radio frequency identification tag integrated circuit 402 may again be mounted to (or in) the tray 401 and the antenna plates 403 and 406 may be printed thereon. In this embodiment, one of the antenna plates 403 is further electrically coupled 404 to an electrical conductor 405 that is disposed around the tray rim. This configuration in turn tends to ensure that this particular antenna plate 403 will become grounded when a human grasps and manipulates the tray 401 by gripping the tray rim and hence contacting (directly or capacitively) the rim-mounted electrical conductor 405.

Other examples are possible and intended. For example, such a capacitively-coupled radio frequency identification tag can be combined with a product ingredient dispenser such as a catsup dispenser, a mayonnaise dispenser, a mustard dispenser, a pickle dispenser, and so forth. In general, the basic notion is to associate a given capacitively-coupled radio frequency identification tag with some aspect of a discrete human-enabled event where human interaction with the capacitively-coupled radio frequency identification tag is likely during effectuation of the event itself.

This human interaction will typically comprise direct electrical or indirect electrical (i.e., capacitive) coupling with one of the antenna plates of the capacitively-coupled radio frequency identification tag to thereby effect electrical grounding of that plate. Electrical grounding of the plate completes an electrical circuit from the reader through the capacitively-coupled radio frequency identification tag via ground, causing the tag to activate and transmit its stored identity to the reader. Such a result may be easily obtained when the humans effecting these events use their hands. In some cases it may be necessary or appropriate or necessary that these individuals wear gloves or the like. In such a case, the gloves may be fully or partially comprised of a material that either permits direct electrical coupling between the person's skin and the capacitively-coupled radio frequency identification tag antenna plate or sufficient indirect capacitive coupling as to accomplish the same effective result.

This process 100 then provides for using 105 the aforementioned identifier to monitor effectuation of the predetermined task, at least in part, by monitoring the human-based task effectuation events via the aforementioned capacitively-coupled radio frequency identification tags. As suggested above, this can be accomplished, at least in part, by detecting when a human makes direct or coupling contact with given ones of the capacitively-coupled radio frequency identification tags (which contact is readily detected as corresponding to the grounding of one of the capacitively-coupled radio frequency identification tag antenna plates via the path to ground that is provided by the human).

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring again to FIG. 2, an illustrative approach to such a platform can further comprise a processor 209 that operably couples to the capacitively-coupled radio frequency identification tag reader(s) 207 and 208 and also, if desired, to a memory 210 that contains, for example, the aforementioned identifier.

This processor 209 can be configured and arranged (via, for example, corresponding programming) to carry out some or all of the process steps described above. This can include correlating the identifier to a predetermined task and using that identifier in conjunction with the capacitively-coupled radio frequency identification tags to monitor the human-based task effectuation events that comprise that predetermined task. This, in turn, can comprise contrasting the occurrence (or non-occurrence) of those events with a model or instruction set regarding what should be happening. Corrective instructions or signals can be provided to aid in preventing mis-assembly and/or incorrectly assembled products can be diverted for correction or other treatment prior to providing that incorrectly assembled product to a customer. This can of course comprise monitoring human compliance with respect to instructions as are provided to the human operators when the instruction provision option described above is employed.

Those skilled in the art will recognize and understand that such an apparatus may be comprised of a plurality of physically distinct elements as is suggested by the illustration shown in FIG. 2. It is also possible, however, to view this illustration as comprising a logical view, in which case one or more of these elements can be enabled and realized via a shared platform (as where only a single reader is employed). It will also be understood that such a shared platform may comprise a wholly or at least partially programmable platform as are known in the art.

Those skilled in the art will readily recognize and appreciate that these teachings offer a highly flexible and leverageable way to efficiently and economically ensure the proper assembly of a given product notwithstanding a variety of attending issues regarding the quality and training of the implementing workforce. Consider, for example, a simple illustration involving the preparation of a sandwich at a fast food restaurant. When the customer places their order via, for example, counter personnel, an identifier is correlated to that particular order. In this illustration that order comprises a cheeseburger having mustard and mayonnaise but no catsup or onions.

Information regarding the order is then communicated to the personnel who will be preparing that order. A first worker can remove a cheeseburger paper wrapper from a corresponding dispenser. That dispenser can have a capacitively-coupled radio frequency identification tag reader antenna disposed proximal thereto and/or formed as a part thereof. Contact between this worker's hand and the capacitively-coupled radio frequency identification tag antenna plate as is printed on that paper wrapper provides a ground path this is discernable by the capacitively-coupled radio frequency identification tag reader that couples to that capacitively-coupled radio frequency identification tag antenna to confirm that this wrapper as corresponds to this order has been removed from the dispenser.

Subsequent placement of this paper wrapper on one or more work surfaces can be similarly detected, monitored, and tracked. This, in turn, can provide information regarding whether the product-in-process is in fact at a correct location. For example, if different condiment toppings are applied at different task effectuation event areas, then detection of this particular paper wrapper at the catsup-dispensing area would be unexpected. Detection of such an event could be used to trigger, for example, an alert to the worker to advise them of the potential for an assembly error.

As a corollary example which may be used in conjunction with the approach suggested above, or in lieu thereof, the individual condiment dispensers may themselves each be provided with a capacitively-coupled radio frequency identification tag. By then providing a reader antenna proximal to the storage position for each dispenser, grasping and removal of each dispenser from its storage position can be similarly detected. This, in turn, will again provide a mechanism by which to detect that a given worker is selecting appropriate, or inappropriate, ingredients as corresponds to a present order.

By providing a reliable means of detecting when the assembly of a customer-specified product such as a meal proceeds in other than a predetermined way, corrective action can be taken to ensure correct assembly or other appropriate steps or remedies be implemented. These teachings can be applied, if desired, only in a teaching and training context or can be employed during commercial effectuation of the predetermined task as may best suit the needs, requirements, and/or opportunities that correspond to a particular application setting.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in this regard, it would be possible to employ these teachings in conjunction with optical code usage. For example, the aforementioned identifier could comprise an optical code (such as a bar code) that appears on a tray place mat. Once selected for use with respect to a given order, that optical code could be read and then used as is otherwise described herein.

We claim:

1. A method comprising:
    correlating an identifier with a predetermined task that comprises at least one discrete human-enabled event;

associating the at least one discrete human-enabled event with a corresponding radio frequency identification tag;
using the identifier to monitor effectuation of the predetermined task, at least in part, by monitoring human-based task effectuation events via the radio frequency identification tags.

2. The method of claim 1 wherein the identifier comprises a substantially unique identifier.

3. The method of claim 1 wherein the predetermined task comprises at least one of:
a training activity;
an assembly activity.

4. The method of claim 1 wherein the at least one discrete human-enabled event is to be carried out by one of:
a single human;
a plurality of humans.

5. The method of claim 1 wherein the at least one discrete human enabled event comprises a plurality of discrete human-enabled events and wherein associating the at least one discrete human-enabled event with a corresponding radio frequency identification tag comprises associating each of the plurality of discrete human-enabled events with a corresponding radio frequency identification tag.

6. The method of claim 1 further comprising:
providing a plurality of radio frequency identification tag reader antennas for wherein at least some of the radio frequency identification tag reader antennas are positioned proximal to selected ones of the human-based task effectuation events.

7. The method of claim 6 wherein using the identifier to monitor effectuation of the predetermined task, at least in part, by monitoring human-based task effectuation events via the radio frequency identification tags comprises detecting when a human makes physical contact with given ones of the radio frequency identification tags.

8. The method of claim 7 wherein the human provides a path to ground upon making the physical contact with given ones of the radio frequency identification tags.

9. The method of claim 6 wherein providing a plurality of radio frequency identification tag reader antennas comprises, at least in part, providing a dispenser for a task-completion component wherein the task-completion component comprises a radio frequency identification tag and the dispenser comprises a radio frequency identification tag reader antenna.

10. The method of claim 1 wherein associating the at least one discrete human-enabled event with a corresponding radio frequency identification tag comprises, at least in part, at least one of:
combining a product container with one of the radio frequency identification tags;
combining a product ingredient dispenser with one of the radio frequency identification tags;
combining a product bearing surface with one of the radio frequency identification tags.

11. The method of claim 1 further comprising:
dynamically providing instructions to at least one human regarding the at least one discrete human-enabled event as a function, at least in part, of the identifier.

12. The method of claim 11 wherein using the identifier to monitor effectuation of the predetermined task, at least in part, by monitoring human-based task effectuation events via the radio frequency identification tags comprises, at least in part, monitoring compliance by the at least one human with respect to the instructions.

13. The method of claim 1 wherein
correlating an identifier with a predetermined task comprises correlating a customer-based purchase order identifier with a customer-specified meal;
associating the at least one discrete human-enabled event with a corresponding radio frequency identification tag comprises combining radio frequency identification tags with specific human-enabled events related to assembly of the customer-specified meal;
using the identifier to monitor effectuation of the predetermined task, at least in part, by monitoring human-based task effectuation events via the radio frequency identification tags comprises detecting when the assembly of the customer-specified meal proceeds other than in a predetermined manner.

14. The method of claim 1 wherein the radio frequency identification tags are selected from a group consisting of radio frequency identification tags and optical identification tags.

15. An apparatus comprising:
a processor configured and arranged to:
correlate an identifier with a predetermined task that comprises at least one discrete human-enabled event;
use the identifier to monitor effectuation of the predetermined task, at least in part, by monitoring human-based task effectuation events via radio frequency identification tags that are each associated with a corresponding discrete human-enabled event as relates to effectuation of the predetermined task.

16. The apparatus of claim 15 wherein the processor is further configured and arranged to monitor the human-based task effectuation events by receiving information from a plurality of radio frequency identification tag reader antennas wherein at least some of the radio frequency identification tag reader antennas are positioned proximal to selected ones of the human-based task effectuation events.

17. The apparatus of 16 wherein the processor is further configured and arranged to use the information to identify particularly popular product configurations.

18. The apparatus of claim 15 wherein the processor is further configured and arranged to dynamically provide instructions to at least one human regarding the at least one discrete human-enabled event as a function, at least in part, of the identifier.

19. The apparatus of claim 18 wherein the processor is further configured and arranged to use the identifier to monitor effectuation of the predetermined task, at least in part, by monitoring human-based task effectuation events via the radio frequency identification tags by, at least in part, monitoring compliance by the at least one human with respect to the instructions.

20. The apparatus of claim 15 wherein the radio frequency identification tags are selected from a group consisting of radio frequency identification tags and optical identification tags.

* * * * *

UNITED STATES PATENT AND TRADEMARK OFFICE
CERTIFICATE OF CORRECTION

| | | |
|---|---|---|
| PATENT NO. | : 7,528,720 B2 | Page 1 of 2 |
| APPLICATION NO. | : 11/380724 | |
| DATED | : May 5, 2009 | |
| INVENTOR(S) | : Collins et al. | |

It is certified that error appears in the above-identified patent and that said Letters Patent is hereby corrected as shown below:

ON THE FACE PAGE

1. On the Face Page, in Field (56), under "OTHER PUBLICATIONS", in Column 2, Line 4, delete "Opinionm"" and Insert -- Opinion," --, therefor.

2. On the Face Page, in the Figure, for Tag "101", Line 3, delete "POSTITIONED" and insert -- POSITIONED --, therefor.

3. On the Face Page, in the Figure, for Tag "104", Line 2, delete "DICERTE" and insert -- DISCRETE --, therefor.

4. On the Face Page, in the Figure, for Tag "104", Line 4, delete "CAPACTIVELY" and insert -- CAPACITIVELY --, therefor.

5. On the Face Page, in the Figure, for Tag "105", In Line 3, delete "PERDETERMINED" and insert -- PREDETERMINED --, therefor.

6. On the Face Page, in the Figure, for Tag "105", Line 5, delete "EFFECUATION" and insert -- EFFECTUATION --, therefor.

IN THE DRAWINGS

7. In Fig. 1, Sheet 1 of 1, for Tag "101", Line 3, delete "POSTITIONED" and insert -- POSITIONED --, therefor.

8. In Fig. 1, Sheet 1 of 1, for "104", Line 2, delete "DICERTE" and insert -- DISCRETE --, therefor.

9. In Fig. 1, Sheet 1 of 1, for Tag "104", Line 4, delete "CAPACTIVELY" and insert -- CAPACITIVELY --, therefor.

Signed and Sealed this
Twenty-fourth Day of April, 2012

David J. Kappos
*Director of the United States Patent and Trademark Office*

CERTIFICATE OF CORRECTION (continued)
U.S. Pat. No. 7,528,720 B2

10. In Fig. 1, Sheet 1 of 1, for Tag "105", Line 3, delete "PERDETERMINED" and insert -- PREDETERMINED --, therefor.

11. In Fig. 1, Sheet 1 of 1, for Tag "105", Line 5, delete "EFFECUATION" and insert -- EFFECTUATION --, therefor.

IN THE CLAIMS

12. In Column 8, Line 41, in Claim 17, after "apparatus of" insert -- claim --.